(12) United States Patent
Sharma et al.

(10) Patent No.: US 9,063,715 B2
(45) Date of Patent: Jun. 23, 2015

(54) MANAGEMENT OF A VIRTUAL POWER INFRASTRUCTURE

(75) Inventors: Ratnesh Kumar Sharma, Fremont, CA (US); Amip J. Shah, Santa Clara, CA (US); Cullen E. Bash, Los Gatos, CA (US); Chih C. Shih, San Jose, CA (US); Chandrakant Patel, Fremont, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 86 days.

(21) Appl. No.: 12/813,012

(22) Filed: Jun. 10, 2010

(65) Prior Publication Data

US 2011/0307110 A1 Dec. 15, 2011

(51) Int. Cl.
| | |
|---|---|
| *G05B 15/02* | (2006.01) |
| *G05B 11/01* | (2006.01) |
| *G05D 3/12* | (2006.01) |
| *H02J 1/00* | (2006.01) |
| *G06F 1/26* | (2006.01) |

(52) U.S. Cl.
CPC .......................................... *G06F 1/26* (2013.01)

(58) Field of Classification Search
CPC ........................................................ G06F 1/26
USPC .............. 307/11, 35; 700/9, 19, 22, 286, 295, 700/297
See application file for complete search history.

(56) References Cited

U.S. PATENT DOCUMENTS

| | | | | | |
|---|---|---|---|---|---|
| 3,906,242 | A | * | 9/1975 | Stevenson | 307/38 |
| 3,932,735 | A | * | 1/1976 | Giras | 700/287 |
| 4,023,043 | A | * | 5/1977 | Stevenson | 307/38 |
| 4,216,384 | A | * | 8/1980 | Hurley | 307/39 |
| 4,262,209 | A | * | 4/1981 | Berner | 290/7 |
| 4,351,028 | A | * | 9/1982 | Peddie et al. | 700/286 |
| 4,549,274 | A | * | 10/1985 | Lerner et al. | 700/295 |
| 4,819,180 | A | * | 4/1989 | Hedman et al. | 700/291 |
| 5,294,879 | A | * | 3/1994 | Freeman et al. | 322/23 |
| 5,621,654 | A | * | 4/1997 | Cohen et al. | 700/287 |
| 5,696,695 | A | * | 12/1997 | Ehlers et al. | 700/286 |
| 5,739,596 | A | * | 4/1998 | Takizawa et al. | 307/66 |
| 5,748,495 | A | * | 5/1998 | Arita et al. | 702/185 |
| 6,021,402 | A | * | 2/2000 | Takriti | 705/412 |
| 6,037,758 | A | * | 3/2000 | Perez | 323/268 |
| 6,154,488 | A | * | 11/2000 | Hunt | 375/219 |

(Continued)

OTHER PUBLICATIONS

Bobroff et al., "Dynamic Placement of Virtual Machines for Managing SLA Violations", IEEE, 2007, pp. 119-128.*

(Continued)

*Primary Examiner* — Robert Fennema
*Assistant Examiner* — Thomas Stevens
(74) *Attorney, Agent, or Firm* — Mannava & Kang (57) ABSTRACT

A virtual power infrastructure for managing distribution of power to a plurality of power demanding units from a plurality of power generators includes a demand manager having logical descriptions of the power demanding units, in which the demand manager is configured to determine power load demands of the power demanding units using the logical descriptions of the power demanding units, and a capacity manager having logical descriptions of the power generators. The capacity manager is configured to determine allocation of power capacity supplied to the power generators from one or more of the power generators to meet the power load demands of the power demanding units, while satisfying one or more predetermined constraints associated with at least one of the power demanding units and the power generators.

20 Claims, 6 Drawing Sheets

(56) References Cited

U.S. PATENT DOCUMENTS

| | | | |
|---|---|---|---|
| 6,211,796 B1* | 4/2001 | Toms et al. | 340/8.1 |
| 6,252,753 B1* | 6/2001 | Bhargava | 361/62 |
| 6,498,462 B2* | 12/2002 | Ballantine et al. | 322/8 |
| 6,618,709 B1* | 9/2003 | Sneeringer | 705/412 |
| 6,640,239 B1* | 10/2003 | Gidwani | 709/203 |
| 6,745,105 B1* | 6/2004 | Fairlie et al. | 700/273 |
| 6,782,343 B2* | 8/2004 | Hasper | 702/182 |
| 6,885,914 B2* | 4/2005 | Shimode et al. | 700/288 |
| 6,925,361 B1* | 8/2005 | Sinnock | 700/286 |
| 7,020,145 B1* | 3/2006 | Symons et al. | 370/400 |
| 7,099,836 B2* | 8/2006 | Cichanowicz | 705/26.8 |
| 7,284,067 B2* | 10/2007 | Leigh | 709/238 |
| 7,333,880 B2* | 2/2008 | Brewster et al. | 700/286 |
| 7,761,140 B2* | 7/2010 | Kontothanassis et al. | 600/509 |
| 7,809,595 B2* | 10/2010 | Breslin et al. | 705/7.28 |
| 8,103,465 B2* | 1/2012 | Brzezowski et al. | 702/62 |
| 2001/0025209 A1* | 9/2001 | Fukui et al. | 700/291 |
| 2002/0040356 A1* | 4/2002 | Gluck et al. | 705/412 |
| 2002/0046155 A1* | 4/2002 | Mashinsky et al. | 705/37 |
| 2002/0103745 A1* | 8/2002 | Lof et al. | 705/37 |
| 2002/0105306 A1* | 8/2002 | Ballantine et al. | 322/20 |
| 2003/0014524 A1* | 1/2003 | Tormasov | 709/226 |
| 2003/0144864 A1 | 7/2003 | Mazzarella | |
| 2003/0202655 A1* | 10/2003 | Nattkemper et al. | 379/413 |
| 2003/0220720 A1* | 11/2003 | Shimode et al. | 700/296 |
| 2004/0041697 A1* | 3/2004 | Nattkemper et al. | 340/310.01 |
| 2004/0086126 A1* | 5/2004 | Lain et al. | 380/277 |
| 2004/0098142 A1* | 5/2004 | Warren et al. | 700/22 |
| 2004/0117136 A1* | 6/2004 | Uggerud et al. | 702/61 |
| 2004/0117330 A1* | 6/2004 | Ehlers et al. | 705/412 |
| 2004/0133314 A1* | 7/2004 | Ehlers et al. | 700/276 |
| 2004/0199294 A1* | 10/2004 | Fairlie et al. | 700/266 |
| 2004/0205032 A1* | 10/2004 | Routtenberg et al. | 705/400 |
| 2005/0109394 A1* | 5/2005 | Anderson | 136/291 |
| 2005/0200133 A1* | 9/2005 | Wobben | 290/55 |
| 2005/0286179 A1* | 12/2005 | Huff et al. | 361/20 |
| 2006/0031180 A1* | 2/2006 | Tamarkin et al. | 705/412 |
| 2006/0190605 A1* | 8/2006 | Franz et al. | 709/226 |
| 2006/0206217 A1* | 9/2006 | Fujii | 700/18 |
| 2006/0208571 A1* | 9/2006 | Fairlie | 307/11 |
| 2008/0104605 A1* | 5/2008 | Steinder et al. | 718/104 |
| 2008/0188955 A1 | 8/2008 | Dittes | |
| 2008/0195255 A1* | 8/2008 | Lutze et al. | 700/291 |
| 2008/0195561 A1* | 8/2008 | Herzig | 705/412 |
| 2009/0043687 A1* | 2/2009 | van Soestbergen et al. | 705/37 |
| 2009/0063228 A1* | 3/2009 | Forbes, Jr. | 705/7 |
| 2009/0072624 A1 | 3/2009 | Towada | |
| 2009/0093916 A1* | 4/2009 | Parsonnet et al. | 700/286 |
| 2009/0144000 A1* | 6/2009 | Herzig | 702/60 |
| 2009/0240381 A1* | 9/2009 | Lane | 700/296 |
| 2009/0281674 A1* | 11/2009 | Taft | 700/286 |
| 2009/0307117 A1* | 12/2009 | Greiner et al. | 705/34 |
| 2009/0310962 A1* | 12/2009 | Bernard et al. | 398/38 |
| 2010/0017045 A1* | 1/2010 | Nesler et al. | 700/296 |
| 2010/0017242 A1* | 1/2010 | Hamilton et al. | 705/8 |
| 2010/0019574 A1* | 1/2010 | Baldassarre et al. | 307/23 |
| 2010/0088261 A1* | 4/2010 | Montalvo | 706/15 |
| 2010/0181780 A1* | 7/2010 | Gillett | 290/1 R |
| 2010/0217550 A1* | 8/2010 | Crabtree et al. | 702/62 |
| 2011/0131431 A1* | 6/2011 | Akers et al. | 713/320 |
| 2012/0046798 A1* | 2/2012 | Orthlieb et al. | 700/297 |
| 2012/0065796 A1* | 3/2012 | Brian et al. | 700/295 |

OTHER PUBLICATIONS

Staber et al., "A Peer-to-Peer-Based Service Intrastructure for Distributed Power Generation", 17th World Congress, The International Federation of Automatic Control, Seoul, Korea, 2008,pp. 13874-13879.*

Das et al., "Automonic Multi-Agent Management of Power and Performance in Data Centers", AAMAS '08 Proceedings, 2008, pp. 107-114.*

Tomorrow's Power Grids/Virtual Power Plants, Siemens AG-Virtual Power Plants, Fall 2009 <http://w1siemens.com/innovation/en/publikationen/pof fall 2009/energie/virtkraft.htm>, 6 pages.

Colin Barras, "Virtual Power Plants Could Tame Coming Grid Chaos", NewsScientist-Tech, Jun. 11, 2009, 5 pages.
<http://www.newscientist.com/article/dn17290-virtual-power-plants-could-tame-coming-grid-haos.html>, 5 pages.

Paige Layne, "Virtual Power Plant in South Charlotte, N.C." Smart Energy Newsroom, Jun. 8, 2009,<http://smartenergynewsroom.com/>.

"VIPER-System for Management of Virtual Power Plant", Athlone Institute of Technology, Ireland, Oct. 16, 2009, <http://www.ncp-sme.net/Countries/IE/PS-SME-IE-467>, 4 pages.

* cited by examiner

FIG. 6

MANAGEMENT OF A VIRTUAL POWER INFRASTRUCTURE

CROSS-REFERENCES

The present application shares some common subject matter with co-pending Provisional Patent Application Ser. No. 60/989,335, entitled "Data Center Synthesis", filed on Nov. 20, 2007, and U.S. patent application Ser. No. 12/260,704, entitled "Virtual Cooling Infrastructure", filed on Oct. 29, 2008, the disclosures of which are hereby incorporated by reference in their entireties.

BACKGROUND

There has been an ever increasing demand for electrical power by many types of users. This increase in demand has also greatly increased the consumption of fossil fuels, coal and other exhaustible materials in generating the electrical power. In addition, alternative power generators that rely upon renewable energy sources, such as, solar, wind, and water flow, are being designed and improved to better meet the electrical power demands, while reducing the reliance on the exhaustible materials. Sole reliance upon either the exhaustible materials or the renewable energy sources, however, is typically not desirable because of the financial cost and adverse environmental impact caused by the consumption of the exhaustible materials and the random unavailability of the renewable energy sources. As such, many consumers rely upon electrical power generated from a combination of exhaustible materials and renewable energy sources. These types of consumers typically receive electrical power generated from the renewable energy sources when that electrical power is available and from the exhaustible materials when electrical power generated from the renewable energy sources is not available, for instance, when there is insufficient sunlight or wind.

Although the approach discussed above is feasible for small scale consumers considered individually or in relatively small groups, this approach may not be feasible when considered for a relatively large group of consumers. For example, instances may occur where there is insufficient production of electrical power from the renewable energy sources, which may overburden exhaustible material consuming power plants. Other instances may occur in which the exhaustible material consuming power plants are generating excessive amounts of electrical power to meet demands due to relatively large amounts of electrical power being generated from renewable energy sources.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein is a virtual power infrastructure and a method of virtualized management of power distribution among a plurality of power demanding units from a plurality of power generators. The virtual power infrastructure and virtualized power distribution management method disclosed herein generally enable the distribution of power to be allocated differently to different parts of a power grid or network, for instance, based upon the locations of the power demanding units on the power grid or network. In addition, various characteristics and constraints pertaining to the power demanding units, the power generators, and the power grid or network may be considered in determining the allocation of the power distribution. For instance, the allocation of the power distribution may be determined based upon the flexibility of the demand, the criticality of the demand, the energy efficiency levels of the power generators, the emissions of the power generators, the environmental footprints of the power generators, etc. Thus, for instance, the allocation distribution that results in the minimal energy consumption and/or minimum emissions footprint, while meeting the power load demands and other constraints, may be determined to thereby substantially optimize the distribution of power to the power demanding units.

Through implementation of the virtual power infrastructure and method disclosed herein, power generators and power demanding units are virtualized to provide improved utilization and/or efficiency of a given power distribution system in meeting power load demands of the power demanding units. In one regard, the virtual power infrastructure and method disclosed herein provide a scalable framework in which various algorithms for distribution, control, negotiation, etc., of power allocation may be applied. In another regard, the virtual power infrastructure and method disclosed herein seamlessly automates the management of diverse individual power generators with the overall service delivery infrastructure of multiple power demanding units.

Figure 1:
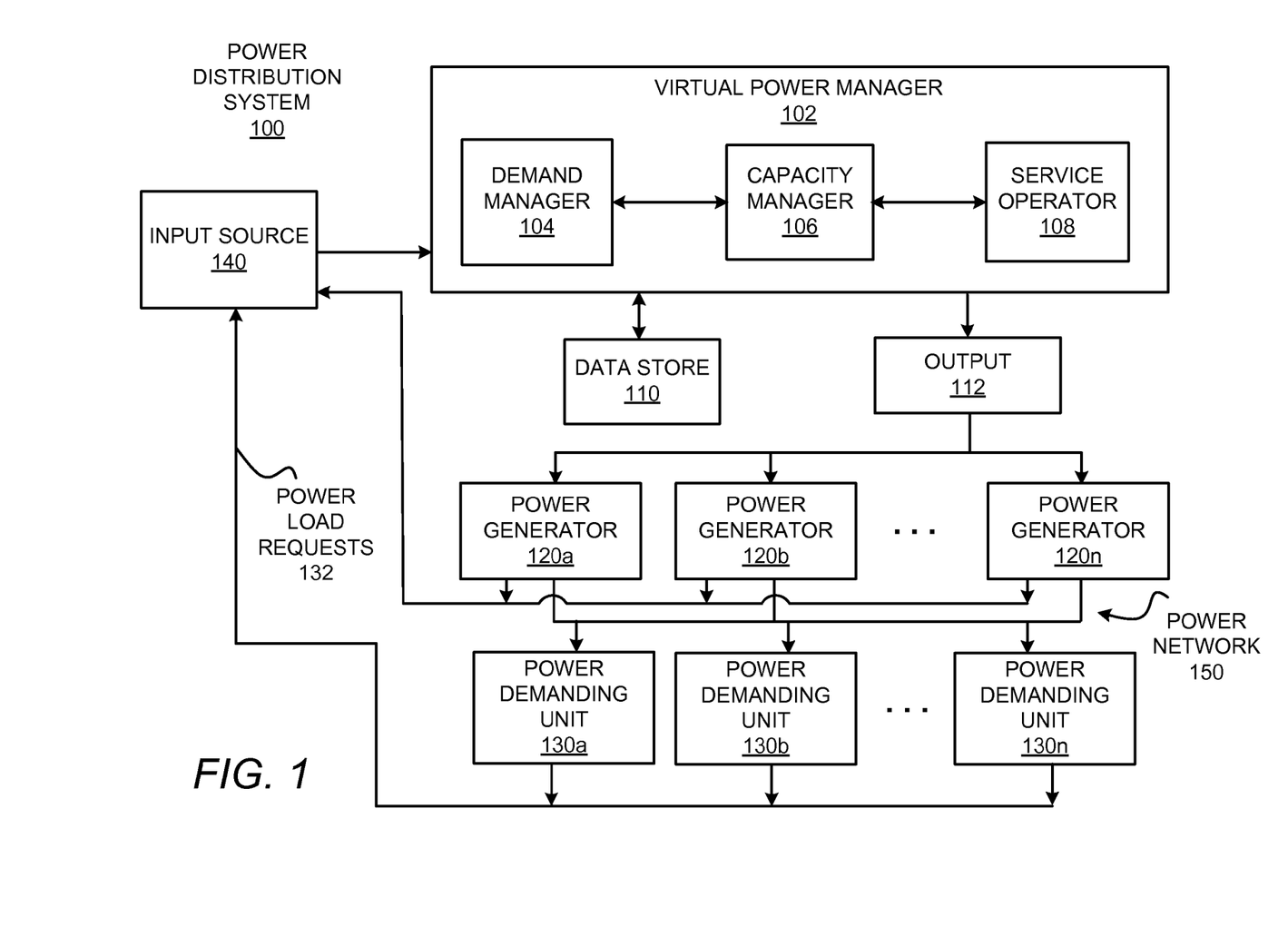
FIG. 1 shows a simplified block diagram of a power distribution system, according to an embodiment of the invention.

With reference first to FIG. 1, there is shown a simplified block diagram of a power distribution system 100, according to an example. It should be understood that the power distribution system 100 may include additional elements and that some of the elements described herein may be removed and/or modified without departing from a scope of the power distribution system 100.

As shown, the power distribution system 100 includes a virtual power infrastructure 102, which may comprise software, firmware, and/or hardware and is configured to virtualize power capacity outputs of a plurality of power generators 120a-120n based upon virtualized power load demand inputs of a plurality of power demanding units 130a-130n or vice versa. Generally speaking, the virtualization of the power generators 120a-120n, as well as virtualization of power demanding units 130a-130n enable improved utilization of a given power supply infrastructure. The virtualization of the power generators 120a-120n and the power demanding units 130a-130n may generally be defined as the creation of logical descriptions of the power generators 120a-120n and the power demanding units 130a-130n. In addition, the virtualization may also be defined as including the creation of logical descriptions of power supply capacities available from the power generators 120a-120n, as well as other characteristics of the power generators 120a-120n and the power demanding units 130a-130n.

The power generators 120a-120n may comprise one or more of a variety of different types of power generators configured to supply power capacity to a power network 150, which may comprise a power grid or microgrid, from which the power demanding units 130a-130n receive electrical power. By way of example, the power generators 120a-120n may comprise nuclear power plants, natural gas power plants, coal based power plants, etc. In addition, the power generators 120a-120n may comprise power plants that operate using renewable energy, such as, solar, wind, water current, etc. The power generators 120a-120n may also comprise smaller scale power generators, such as, local exhaustible material consuming power generators, local solar-cell based power generators, etc.

The power generators 120a-120n may thus comprise one or more of dispatchable power generators, which are committed by contract to provide a predetermined amount of power, such as the exhaustible material consuming power generators, and other types of power generators that are not committed by contract, such as, for instance, the renewable energy-based power generators. Thus, for instance, a consumer may be provided with various choices in receiving power from the dispatchable power generators and the renewable energy-based power generators. In one regard, the consumer may select to pay the relatively higher rate for energy received from the dispatchable power generators since that energy is relatively more reliable than the energy supplied by the renewable energy-based power generators. On the other hand, the consumer may elect to receive more energy from the renewable energy-based power generators and may pay a relatively lower rate, but face a greater risk of unreliability. In one regard, the consumer's selection may be contained in a service level agreement (SLA) between the consumer and the power providers.

The power demanding units 130a-130n may comprise any of a variety of different types of devices or groups of devices that consume electrical energy during their operations. By way of example, the power demanding units 130a-130n may comprise relatively small electronic devices, such as, servers, networking equipment, stereo receivers, televisions, refrigerators, air conditioning units, etc. As another example, the power demanding units 130a-130n may comprise groups of electronic devices used in relatively larger structures, such as one or more rooms in a building, an entire building, a cluster of buildings, etc. As a particular example, the power demanding units 130a-130n comprise a plurality of servers and other electronic devices configured to provide information technology services.

The virtual power manager 102 is depicted as including a demand manager 104, a capacity manager 106, and a service operator 108, configured to perform various functions described herein below. In one example, the virtual power manager 102 comprises software stored on a computer-readable storage medium, which may be implemented by a controller of a computing device. In another example, the virtual power manager 102 comprises a single overlay in an integrated power management system.

In instances where the virtual power manager 102 comprises software, the virtual power manager 102 may be stored on a computer readable storage medium in any reasonably suitable descriptive language and may be executed by the processor of a computing device (not shown). In these instances, the demand manager 104, the capacity manager 106, and the service operator 108 may comprise software modules or other programs or algorithms configured to perform the functions described herein below.

In addition, or alternatively, the virtual power manager 102 may comprise firmware or hardware components. In these instances, the virtual power manager 102 may comprise a circuit or other apparatus configured to perform the functions described herein. In addition, the demand manager 104, the capacity manager 106, and the service operator 108 may comprise one or more of software modules and hardware modules, such as one or more circuits.

As shown in FIG. 1, the virtual power manager 102 is configured to receive input from an input source 140. The input source 140 may comprise a computing device, a storage device, a user-input device, etc., through or from which data may be inputted into the virtual power manager 102. In this regard, the input source 140 may be locally connected to the virtual power manager 102 or may be connected through a network, such as, the Internet. Alternatively, the virtual power manager 102 and the input source 140 may form part of the same computing device or software package.

The data inputted from or through the input source 140 may include, for instance, logical representations of the power demanding units 130a-130n and the power generators 120a-120n, which may be stored in a data store 110. The inputted data may also include power load requests 132, power demanding unit 130a-130n constraints, power generator 120a-120n constraints, etc. The data may also include costs, which may be economic and/or environmental costs, associated with generating power in the power generators 120a-120n. The virtual power manager 102 may utilize the data as the data is received or may store the data in the data store 110, which may comprise a combination of volatile and non-volatile memory, such as DRAM, EEPROM, MRAM, flash memory, and the like. In addition, or alternatively, the data store 110 may comprise a device configured to read from and write to a removable media, such as, a floppy disk, a CD-ROM, a DVD-ROM, or other optical or magnetic media.

The input source 140 may also comprise an interface through which various information pertaining to one or more constraints that the virtual power manager 102 is configured to meet in allocating power capacity from the power generators 120a-120n to the power demanding units 130a-130n may be entered into the virtual power manager 102. Examples of the one or more constraints are discussed in greater detail herein below with respect to FIGS. 2A and 2B.

As also discussed in greater detail herein below, the virtual power manager 102 is configured to determine allocation of power capacity from one or more of the power generators 120a-120n supplied to the power network 150 based upon the power load demands of the power demanding units 130a-130n and one or more predetermined constraints. In one example, the virtual power manager 102 outputs data pertaining to the determined allocations of power capacity to an output 112, which may comprise, for instance, a display configured to display the determined capacity outputs, a fixed or removable storage device on which the determined capacity outputs are stored, a connection to a network over which the identified set of capacities may be communicated. In addition, or alternatively, the virtual power manager 102 outputs control signals or instructions for implementing the determined capacity outputs for the power generators 120a-120n through the output 112, which may comprise, for instance, a network connection to one or more of the power generators 120a-120n.

Various operations that the demand manager 104, the capacity manager 106, and the service operator 108 are operable to perform will be described with respect to the following process diagrams 200 and 220 respectively depicted in FIGS. 2A and 2B. It should be understood that the process diagrams 200 and 220 may include additional elements and that some of the elements described herein may be removed and/or modified without departing from respective scopes of the process diagrams 200 and 220.

Figure 2A:
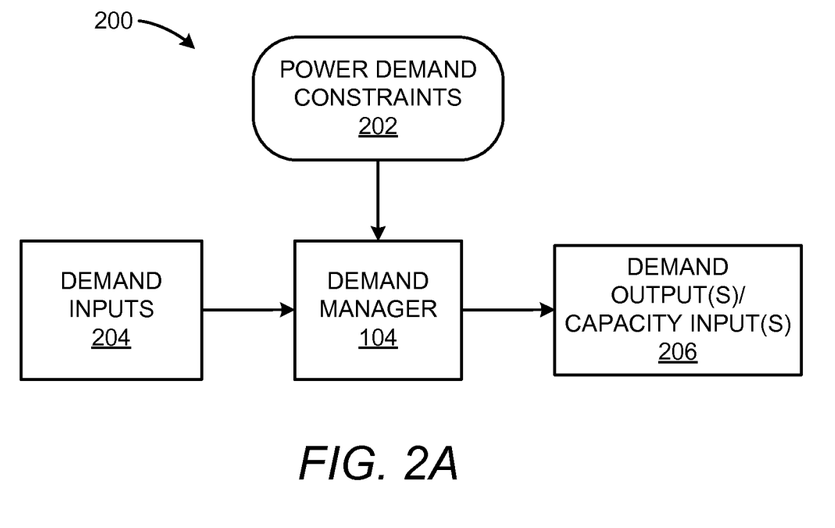
FIG. 2A illustrates a process diagram of a demand manager depicted in FIG. 1, according to an embodiment of the invention.

Turning first to FIG. 2A, there is shown a process diagram 200 of the demand manager 104, according to an example. As shown therein, the demand manager 104 receives power demand constraints 202 and demand inputs 204. In addition, the demand manager 104 outputs demand outputs/capacity inputs 206.

The power demand constraints 202 may include, for instance, various constraints pertaining to the supply of electrical power to the power demanding units 130a-130n. By way of example, the power demand constraints 202 may include the reliability levels of the electrical power required by the power demanding units 130a-130n, the quality of the electrical power required by the power demanding units 130a-130n, various regulations that the power demanding units 130a-130n are required to comply with, service level agreement (SLA) provisions, uptime requirements of the power demanding units 130a-130n, etc. The SLA provisions may include, for instance, the percentage of power to be supplied from power generators 120a-120n that employ renewable energy sources to generate electrical power, the times when power is to be supplied from power generators 120a-120n that consume exhaustible materials, the uptime requirements of the power supplied to the power demanding units 130a-130n, etc. The SLA provisions may also include, for instance, cost limits associated with supplying power to the power demanding units 130a-130n.

The demand inputs 204 may include, for instance, various inputs associated with the workloads performed or to be performed by the power demanding units 130a-130n. The various inputs include, for instance, workload characteristics, workload locations, workload durations, criticality of the workloads, etc., that are performed or are scheduled to be performed by the power demanding units 130a-130n. The criticalities of the workloads to be performed by the power demanding units 130a-130n may be based, for instance, upon the importance of maintaining a reliable supply of power to the power demanding units 130a-130n. Thus, for instance, the power demanding units 130a-130n of a hospital will likely have a higher criticality level than the power demanding units 130a-130n of an office building.

In one regard, the demand manager 104 is configured to forecast how the power load demands of the power demanding units 130a-130n are likely to change with time, for instance, based upon historical workload trends. In another regard, the demand manager 104 is configured to implement a recovery plan in the event that one or more of the power generators 120a-120n, the power network 150, and/or the power demanding units 130a-130n fail. By way of example, the demand manager 104 is configured to implement a demand recovery pattern to reschedule workloads in the event of a fault and to pass the new power load demands through to the capacity manager 106.

The demand manager 104 is configured to process the power demand constraints 202 and the demand inputs 204 to determine at least one demand output 206. The at least one demand output 206 may include, for instance, power load demand estimates, locations of power load demands, durations of power load demands, costs of deploying the power load demands, power load demand zone designations, sustainability limits of the power demanding units 130a-130n, etc. Thus, for instance, the demand manager 104 is configured to calculate the demand outputs based upon the provisions contained in one or more SLAs and the availability of spare capacity in the power generators 120a-120n. As discussed with respect to FIG. 2B, the demand outputs 206 are equivalent to the capacity inputs 206 that are inputted into the capacity manager 106.

According to an example, the demand manager 104 is configured to convert the demand inputs 204 into power capacity requirements of the power demanding units 130a-130n. The demand manager 104 is thus configured to translate the workloads performed or scheduled to be performed by the power demanding units 130a-130n into actual power capacity requirements of the power demanding units 130a-130n. In addition, the demand manager 104 is configured to determine costs, which may include either or both of economic and environmental costs, associated with the power capacity requirements.

Figure 2B:
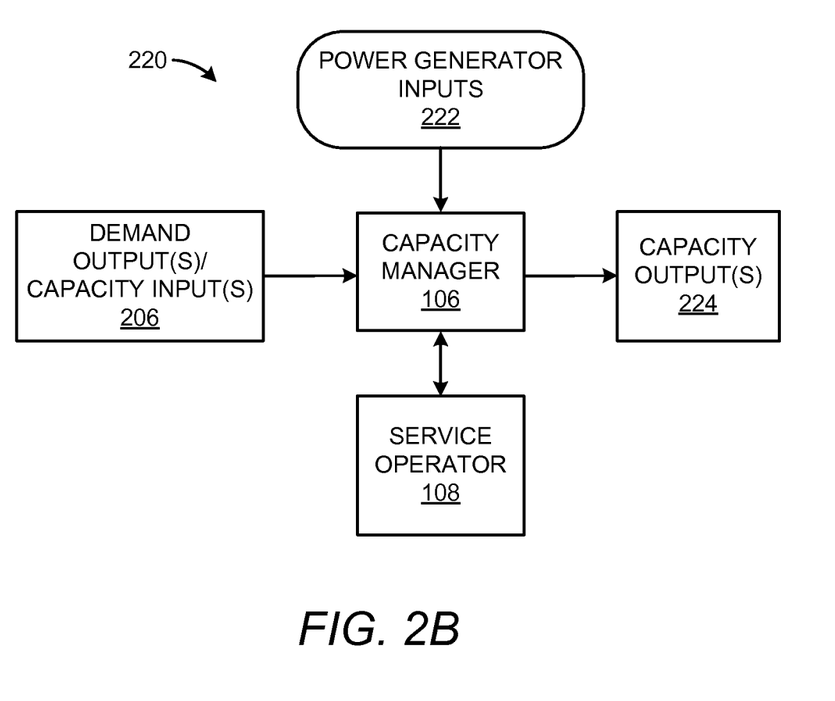
FIG. 2B illustrates a process diagram of a capacity manager and a service operator depicted in FIG. 1, according to an embodiment of the invention.

With respect now to FIG. 2B, there is shown a process diagram 220 of the capacity manager 106 and the service operator 108, according to an example. As shown therein, the capacity manager 106 receives power generator inputs 222. The power generator inputs 222 may include, for instance, one or more of descriptions of the power generators 120a-120n, schedule of operation of the power generators 120a-120n, available capacities of the power generators 120a-120n, continuous power capacity limits of the power generators 120a-120n, maximum capacity limits of the power generators 120a-120n, coefficients of performance of the power generators 120a-120n, current fault levels of each of the power generators 120a-120n, etc. The descriptions of the power generators 120a-120n may include, for instance, one or more of a description of the resources consumed by the power generators 120a-120n, a description of the operating cost functions of the power generators 120a-120n, emissions of the power generators 120a-120n, the environmental footprints of the power generators 120a-120n, reliabilities of the power generators 120a-120n, etc. The operating cost functions may include, for instance, a determination of the economic impact of operating the power generators 120a-120n over time. In addition, the operating cost function may be in monetary terms or in terms of environmental impact, such as, exergy, carbon footprint, etc.

The capacity manager 106 is further configured to determine an allocation of power capacity to be supplied to the power demanding units 130a-130n from specific ones of the power generators 120a-120n based upon the information contained in the demand output(s)/capacity input(s) 206. In other words, the capacity manager 106 is configured to determine allocation of the power generators 120a-120n capacities to meet the power load demands of the power demanding units 130a-130n while satisfying one or more predetermined constraints associated with at least one of the power demanding units 130a-130n and the power generators 120a-120n.

According to an example, the capacity manager 106 is configured to map out the demand outputs/capacity inputs 206 to the capacity outputs 224 subject to the one or more predetermined constraints associated with at least one of the power demanding units 130a-130n and the power generators 120a-120n. The capacity outputs 224 may include, for instance, capacity allocation, identification of zones for allocation of the power supply capacities, estimates of the power to be supplied, the total cost of ownership, the utilization levels, and the environmental impact associated with supplying power to meet the power load demands as determined by the demand manager 104.

The capacity manager 106 thus operates in a relatively more intelligent manner as compared with conventional power provisioning system controllers because the capacity manager 106 factors considerations that have relevance to a broader range of power demanding units 130a-130n and power generators 120a-120n. Moreover, the capacity manager 106 monitors the operations of the power demanding units 130a-130n and power generators 120a-120n to substantially ensure that one or more policies are being maintained. For instance, the capacity manager 106 monitor the operations of the power generators 120a-120n to substantially ensure that the provisions of one or more SLAs are being satisfied.

In another embodiment, the service operator 108 may form part of the capacity manager 106 and may be configured to act as a monitoring agent for the performance of workloads on the power demanding units 130a-130n and the supply of power by the power generators 120a-120n. In one regard, the service operator 108 is configured to identify any service interruption and to pass on information pertaining to the service interruption to the demand manager 104 for short term failure mitigation.

In addition, the capacity manager 106 and/or the service operator 108 is programmed to operate with an understanding that the power generated by the power generators 120a-120n are limited and may thus prioritize the order in which the workloads are performed to also prioritize the order in which power is supplied to the power consuming units 130a-130n. More particularly, the prioritization of the supply of power to the power demanding units 130a-130n may be based upon a plurality of inputs and constraints and the capacities of the power generators 120a-120n. In one regard, the capacity manager 106 and/or the service operator 108 are able to perform these negotiations because the capacity manager 106 and/or the service operator 108 receives global information pertaining to the capacities of the power generators 120a-120n and the power demanding units 130a-130n.

Figure 3:
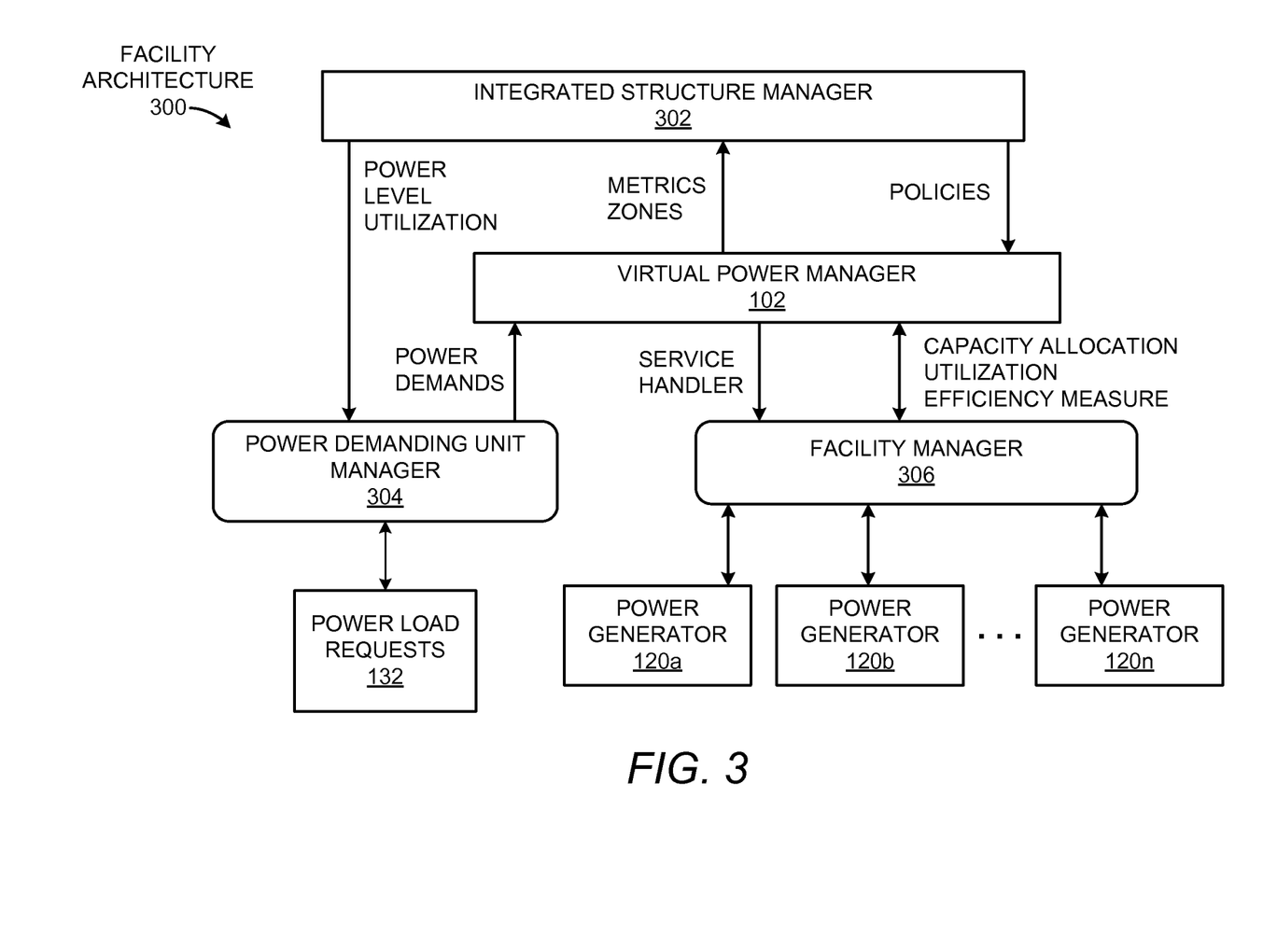
FIG. 3 shows a facility architecture employing the virtual power infrastructure depicted in FIG. 1, according to an embodiment of the invention.

Turning now to FIG. 3, there is shown a facility architecture 300 employing the virtual cooling manager 102 depicted in FIG. 1, according to an example. It should be understood that the facility architecture 300 may include additional elements and that some of the elements described herein may be removed and/or modified without departing from a scope of the facility architecture 300.

As shown in FIG. 3, the facility architecture 300 includes an integrated structure manager 302, a power demanding unit manager 304, and a facility manager 306. The integrated structure manager 302 is configured to supply the virtual power manager 102 with information pertaining to various policies that the virtual power manager 102 is intended to follow. The policies may include, for instance, provisions set forth in a service level agreement (SLA), power usage goals, workload performance goals, etc.

The power demanding unit manager 304 receives power load requests 132 and forwards the power load requests 132 information to the demand manager 104 of the virtual power manager 102. The power demanding unit manager 304 also receives information pertaining to desired utilization of power levels for the power demanding units 130a-130n from the integrated structure manager 302. The facility manager 306 receives power capacity information from the power generators 120a-120n, such as, the level of capacity remaining in the power generators 120a-120n, the fault status of the power generators 120a-120n, etc. The facility manager 306 also receives power usage information from power delivery devices 310 configured to supply power to the cooling system components 120. The facility manager 308 forwards this information to the capacity manager 106 of the virtual power manager 102.

As discussed above, the demand manager 104 estimates the power load demands required by the power demanding units 130a-130n and the capacity manager 106 determines the allocation of power capacity to the power demanding units 130a-130n based upon the available capacities of the power generators 120a-120n, while remaining within the capacity limitations of the power generators 120a-120n and satisfying one or more predetermined constraints. In determining the allocation of the power capacities, the capacity manager 106 may factor one or more of the utilization levels, the efficiency measures, the emissions, the environmental footprints, etc., of the power generators 120a-120n.

As further shown in FIG. 3, the virtual power manager 102 may communicate instructions to the facility manager 308 to vary the generation and supply of power from one or more of the power generators 120a-120n. In addition, the virtual power manager 102 may also communicate information pertaining to service handling, for instance, passage of a service from one component of an infrastructure to another, to the facility manager 306.

The virtual power manager 102 also communicates information pertaining to various metrics and cooling resource allocation zones to the integrated structure manager 302. The various metrics may include, for instance, power load estimates, workload locations, workload durations, zones of workload placement, thermal management limits, cost of deployment, etc.

Figure 4:
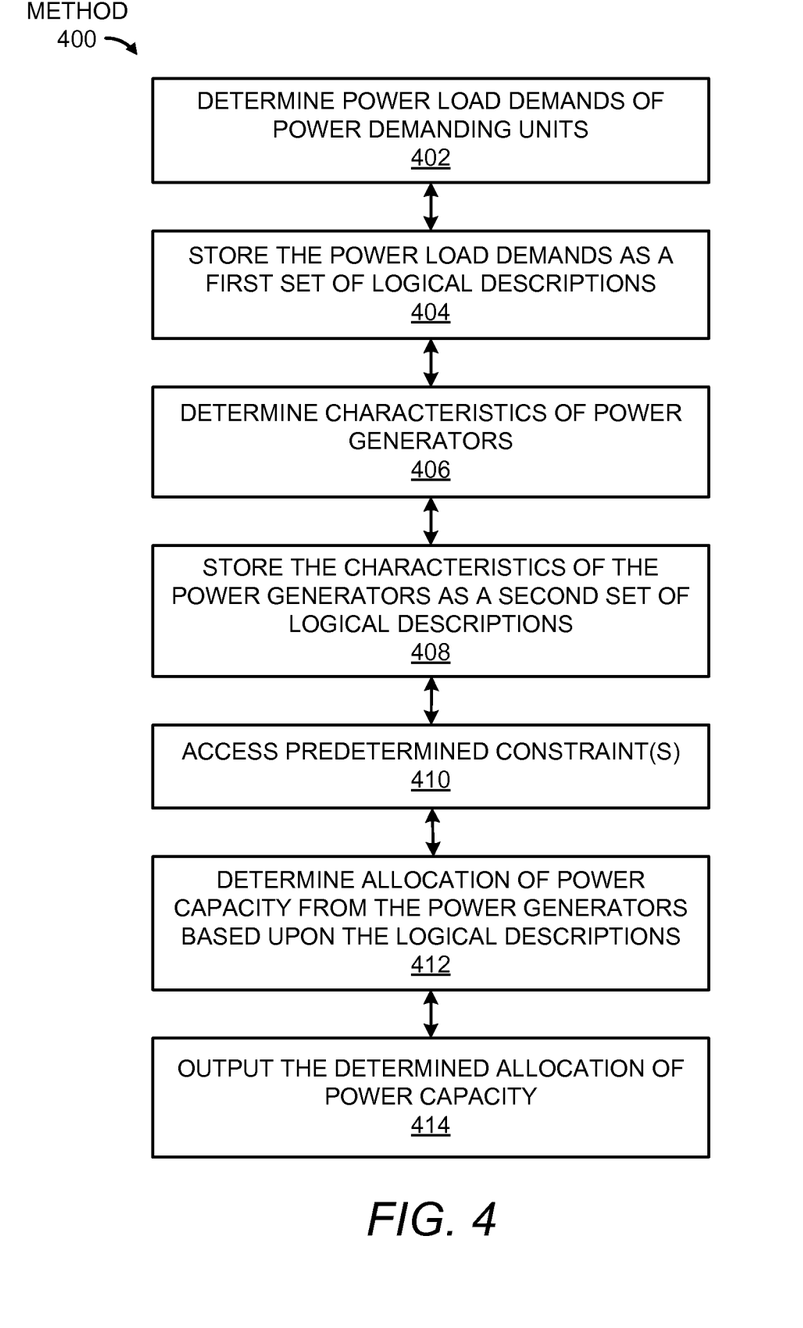
FIG. 4 shows a flow diagram of a method of virtualized management of power distribution among a plurality of power demanding units from a plurality of power generators, according to an embodiment of the invention.

With reference now to FIG. 4, there is shown a flow diagram of a method 400 of virtualized management of power distribution among a plurality of power demanding units 130a-130n from a plurality of power generators 120a-120n, according to an example. It should be apparent to those of ordinary skill in the art that the method 400 represents a generalized illustration and that other steps may be added or existing steps may be removed, modified or rearranged without departing from a scope of the method 400.

The description of the method 400 is made with reference to the power distribution system 100 illustrated in FIG. 1, and thus makes reference to the elements cited therein. It should, however, be understood that the method 400 is not limited to the elements set forth in the power distribution system 100. Instead, it should be understood that the method 400 may be practiced by a system having a different configuration than that set forth in the system 100.

As shown in FIG. 4, at step 402, power load demands of the plurality of power demanding units 130a-130n are determined, for instance, by the demand manager 104. As discussed above, the demand manager 104 may determine the power load demands of the power demanding units 130a-130n based upon demand inputs 204 and the power demand constraints 202. In addition, the demand manager 104 may employ any of a variety of different techniques in interpreting input data to determine the power load demands of the plurality of power demanding units. For instance, the demand manager 104 may employ stream mining of discrete data to identify recurring patterns in the input data to determine the power load demands. As another example, the demand manager 104 may employ pattern recognition techniques to determine the power load demands, in which an identified pattern is compared to one or more of mined historical patterns. As a further example, the demand manager 104 may employ a state-wise evaluation technique in which one or more exemplary traits, such as, peak, average, modal recurrences, etc., of the input data are tabulated to determine the power load demands. In any regard, at step 404, the power load demands are converted to a first set of logical descriptions and stored, for instance, in the data store 110 by the demand manager 104.

At step 406, characteristics of the power generators 120a-120n are determined, for instance, by the capacity manager 106. The capacity manager 206 may determine the characteristics of the power generators 120a-120n, such as descriptions, energy efficiencies, resource consumption levels, cost functions, emissions, the environmental footprints, reliability levels, power output capacity limitations, available capacities, etc., of the power generators 120a-120n from information received from the power generators 120a-120n, information pertaining to the power generators 120a-120n stored in a database, and/or from a user.

The capacity manager 106 may employ any of a variety of techniques in determining, for instance, available capacities of the power generators 120a-120n. For instance, the capacity manager 106 may employ an environmentally matched modeling technique, in which a subset of environmental parameters, such as, wind velocity, solar incidence, air temperature, etc., are functionally mapped into a generation capacity using one or more of theoretical or empirical relationships. As another example, the capacity manager 106 may employ an efficiency-based modeling technique, in which the efficiency of various power generators 120a-120n is predicted using one or more theoretical (e.g. thermodynamic) or empirical relationships, and these efficiencies are then superposed using mathematical functions to obtain an aggregate power delivery efficiency. As a further example, the capacity manager 106 may employ a weighted cost model technique, in which a weight is attached to a generation mechanism (such as a fuel or a type of generation mechanism) of the power generators 120a-120n based on one or more predetermined parameters (such as, the carbon emissions associated with a power generation process; the cost of the fuel and/or operating the generator; etc). This weight is then assigned to each individual source, and scaled by the untapped capacity to obtain an overall capacity assessment; etc.

At step 408, the characteristics of the power generators 120a-120n are converted to a second set of logical descriptions and stored, for instance, in the data store 110 by the capacity manager 104.

At step 410, one or more predetermined constraints are accessed, for instance, by either or both of the capacity manager 106 and the demand manager 104. The one or more predetermined constraints may comprise, for instance, information contained in the power demand constraints 202 (FIG. 2A), the power generator inputs 222 (FIG. 2B), etc., as discussed above.

At step 412, the allocation of power capacity from one or more of the power generators 120a-120n to be supplied to the power demanding units 130a-130n based upon the first set of logical descriptions and the second set of logical descriptions while meeting one or more of the predetermined constraints associated with at least one of the power demanding units 130a-130n and the power generators 120a-120n is determined. The capacity manager 106 may determine the allocation of the power capacity using any of a variety of techniques. For example, the capacity manager 106 may employ a hierarchical assignment technique, in which resources from a multi-tier supply infrastructure are assigned on a tiered basis to satisfy single-tier demand (note that the tiering of the supply infrastructure may be achieved through one or more of the methods discussed above with interpreting the available capacities of the power generators 120a-120n). As another example, the capacity manager 106 may employ a parametrized match technique, in which resources from the supply infrastructure are assigned based on the response to one or more parametric variables, which may include either or both factors that are internal and external to the infrastructure itself (for instance, the internal factors may include load patterns, response time considerations etc; the external factors may include time-of-day, environmental conditions etc). As another example, the capacity manager 106 may employ a phase assignment technique, in which resources from the supply infrastructure are phase matched to the demand load.

At step 414, the determined allocation of power capacity is outputted, for instance, through the output 112. As discussed above, the determined allocation may be outputted to a user through a display or other connection. In addition, or alternatively, the determined allocation may be outputted as instructions for controlling operations of the one or more power generators 120a-120n in supplying power to the power network 150.

Some or all of the operations set forth in the method 400 may be contained as a utility, program, or subprogram, in any desired computer accessible medium. In addition, the method 400 may be embodied by a computer program, which can exist in a variety of forms both active and inactive. For example, they may exist as software program(s) comprised of program instructions in source code, object code, executable code or other formats. Any of the above may be embodied on a computer readable medium.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 5:
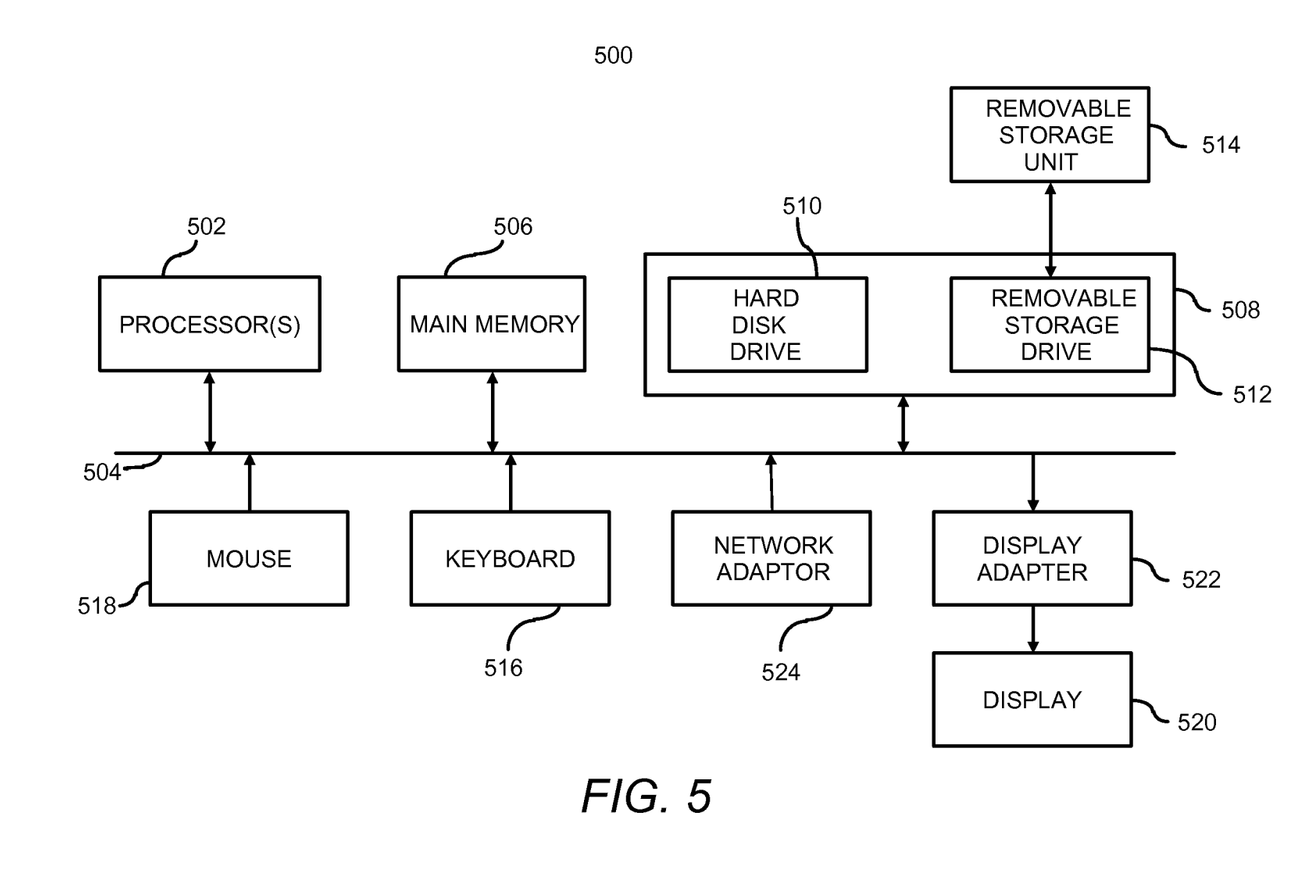
FIG. 5 shows a block diagram of a computing apparatus configured to implement or execute the virtual power infrastructure depicted in FIG. 1, according to an embodiment of the invention.

FIG. 5 illustrates a block diagram of a computing apparatus 500 configured to implement or execute the virtual power manager 102 depicted in FIG. 1, according to an example. In this respect, the computing apparatus 500 may be used as a platform for executing one or more of the functions described hereinabove with respect to the virtual power manager 102.

The computing apparatus 500 includes a processor 502 that may implement or execute some or all of the steps described in the method 400. Commands and data from the processor 502 are communicated over a communication bus 504. The computing apparatus 500 also includes a main memory 506, such as a random access memory (RAM), where the program code for the processor 502, may be executed during runtime, and a secondary memory 508. The secondary memory 508 includes, for example, one or more hard disk drives 510 and/or a removable storage drive 512, representing a floppy diskette drive, a magnetic tape drive, a compact disk drive, etc., where a copy of the program code for the method 400 may be stored.

The removable storage drive 510 reads from and/or writes to a removable storage unit 514 in a well-known manner. User input and output devices may include a keyboard 516, a mouse 518, and a display 520. A display adaptor 522 may interface with the communication bus 504 and the display 520 and may receive display data from the processor 502 and convert the display data into display commands for the display 520. In addition, the processor(s) 502 may communicate over a network, for instance, the Internet, LAN, etc., through a network adaptor 524.

Figure 6:
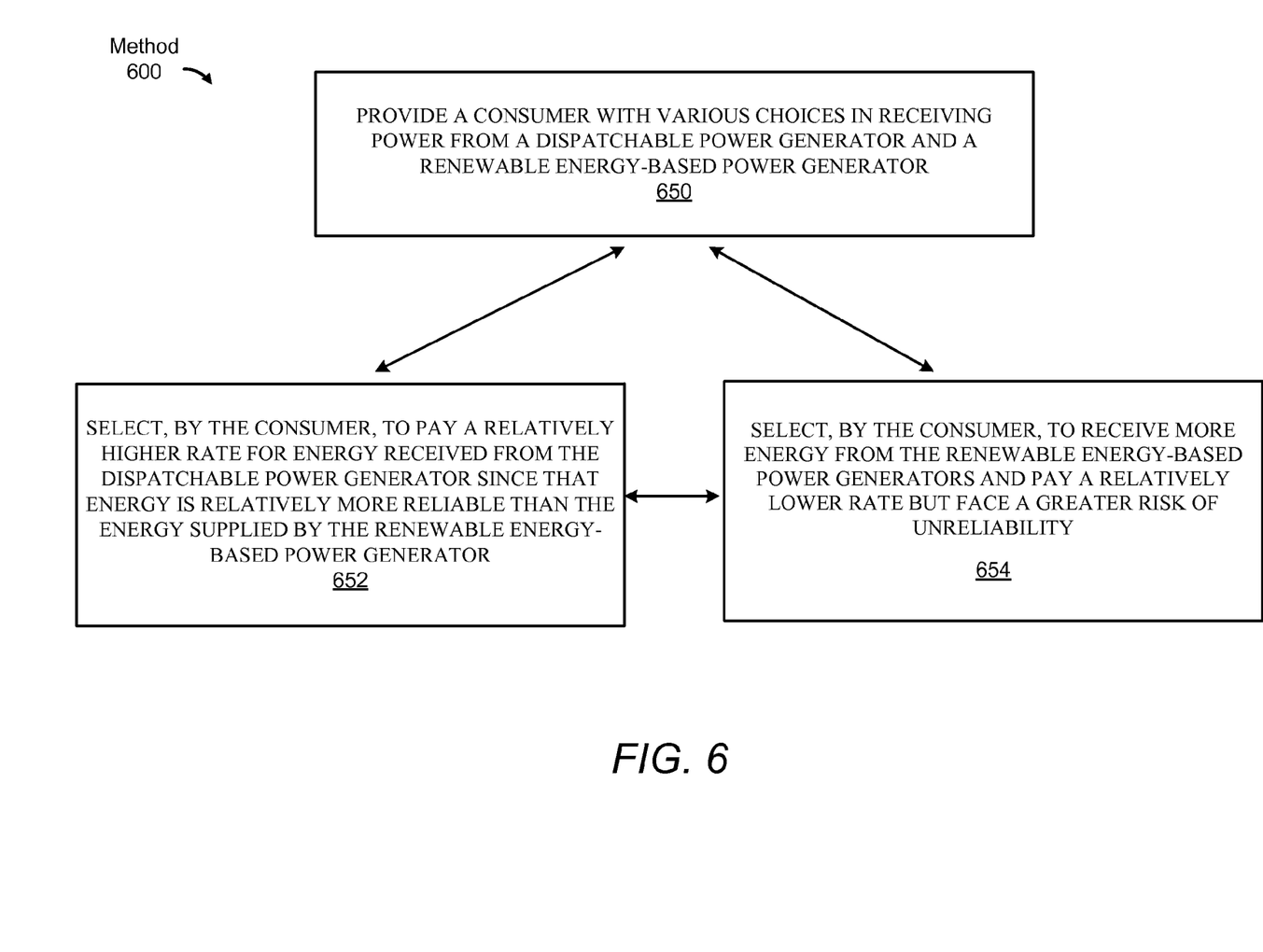
FIG. 6 shows a flow diagram of a method of virtualized management of power distribution, according to an embodiment of the invention.

FIG. 6 shows a flow diagram of a method 600 of virtualized management of power distribution, according to an embodiment of the invention. Power generators (e.g., power generators 120a-120n in FIG. 1) may comprise one or more of dispatchable power generators, which are committed by contract to provide a predetermined amount of power, such as the exhaustible material consuming power generators, and other types of power generators that are not committed by contract, such as, for instance, the renewable energy-based power generators. Thus, for instance, a method can include, at 650, a consumer being provided with various choices in receiving power from the dispatchable power generators and the renewable energy-based power generators. In one regard, the consumer may select, at 652, to pay the relatively higher rate for energy received from the dispatchable power generators since that energy is relatively more reliable than the energy supplied by the renewable energy-based power generators. On the other hand, the consumer may select, at 654, to receive more energy from the renewable energy-based power generators and may pay a relatively lower rate, but face a greater risk of unreliability. In one regard, the consumer's selection may be contained in a service level agreement (SLA) between the consumer and the power providers.

It will be apparent to one of ordinary skill in the art that other known electronic components may be added or substituted in the computing apparatus 500. It should also be apparent that one or more of the components depicted in FIG. 5 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A virtual power infrastructure, comprising:
a non-transitory computer readable storage medium with instructions stored thereon for managing distribution of power to a plurality of power demanding units from a plurality of power generators, wherein the plurality of power demanding units and the plurality of power generators are each a separate non-overlapping set of a plurality of entities and the plurality of power generators includes at least two types of power generators, wherein the two types of generators includes at least two of nuclear power, natural gas power, coal-based power, solar power, wind power, and water power, said infrastructure comprising:
a demand manager having logical descriptions of the power demanding units, wherein the demand manager determines power load demands of the power demanding units using:
the logical descriptions of the power demanding units;
a determination of a reliability of at least one of the plurality of power generators; and
a first cost for a first amount of energy produced by at least one of the at least two types of power generators and a second cost for a second amount of energy produced by at least another of the at least two types of power generators;
a capacity manager having logical descriptions of the power generators, wherein the power generators supply power to the power demanding units, and wherein the capacity manager determines allocation of power capacity supplied to the power demanding units from one or more of the power generators to meet the power load demands of the power demanding units, while satisfying one or more predetermined constraints that include a selection by a consumer of the power that indicates the first cost of the first amount of energy and the second cost of the second amount of energy associated with at least one of the power demanding units, wherein the first amount of energy and the second amount of energy are selected based on a total cost for energy from the at least two types of power generators,
wherein the one or more predetermined constraints comprise one or more of service level agreement (SLA) provisions and power generator distribution constraints.

2. The virtual power infrastructure according to claim 1, wherein the demand manager determines the power load demands of the power demanding units based upon one or more aspects of workloads that are at least one of performed and scheduled to be performed by the power demanding units and one or more power demand constraints pertaining to performance of the workloads.

3. The virtual power infrastructure according to claim 1, wherein the demand manager determines at least one characteristic of the power load demand, the at least one characteristic comprising one or more of operational levels, redundancy, and cost of deployment to satisfy the power load demands of the power demanding units, and wherein the capacity manager further determines allocation of the power capacity supplied to the power generators based upon the at least one characteristic.

4. The virtual power infrastructure according to claim 1, wherein the logical descriptions of the power demanding units comprise one or more of power reliability requirements, power load demand descriptions, power load demand forecasts, power load demand recovery patterns, criticalities, and elasticity of demand based on pricing model, of the power demanding units.

5. The virtual power infrastructure according to claim 1, wherein the power load demands comprise one or more of power load demand estimates, locations of power load demands, durations of power load demands, costs of deploying the power load demands, power load demand zone designations, and sustainability limits of the power demanding units.

6. The virtual power infrastructure according to claim 1, wherein the logical descriptions of the power generators comprise one or more of descriptions, energy efficiencies, resource consumption levels, cost functions, emissions, environmental footprints, reliability levels, power output capacity limitations, and available capacities of the power generators.

7. The virtual power infrastructure according to claim 6, wherein the capacity manager determines allocation of the power capacities of the power generators to substantially optimize at least one of efficiency, cost, and fault tolerance of the power generators in supplying power to the power demanding units based upon the logical descriptions of the power generators.

8. The virtual power infrastructure according to claim 1, wherein the capacity manager determines one or more of allocation of the power supply capacities, identification of zones for allocation of the power supply capacities, estimates of the power to be supplied, a total cost of ownership, utilization levels, and environmental impact associated with supplying power to meet the power load demands as determined by the demand manager.

9. The virtual power infrastructure according to claim 1, wherein the capacity manager follows one or more of techniques in determining the allocation of the power capacity, said one or more techniques comprising a hierarchical assignment technique, a parameterized match technique, and a phase assignment technique.

10. The virtual power infrastructure according to claim 1, wherein the one or more predetermined constraints further comprise one or more of power generator capacity constraints, reliability levels of electrical power required by the power demanding units, quality of the electrical power required by the power demanding units, various regulations that the power demanding units are required to comply with, and uptime requirements of the power demanding units.

11. The virtual power infrastructure according to claim 1, wherein the demand manager interprets data pertaining to the power load demands of the power demanding units through one or more of stream mining of discrete data to identify recurring patterns in the data, pattern recognition techniques, and state-wise evaluation.

12. The virtual power infrastructure according to claim 1, further comprising:
a service operator to operate as a monitoring agent and a broker for distribution of power from the power generators to the power demanding units, wherein the service operator monitors operations of the power demanding units and the power generators to substantially ensure that the power demanding units are receiving sufficient amounts of power while meeting the one or more predetermined constraints.

13. The virtual power infrastructure according to claim 1, wherein the demand manager, the capacity manager, and a service operator form part of a single overlay in an integrated power management system.

14. A method of virtualized management of power distribution, comprising:
utilizing a non-transitory computer readable storage medium with instructions stored thereon for management of power distribution among a plurality of power demanding units from a plurality of power generators, wherein the plurality of power demanding units and the plurality of power generators are each a separate non-overlapping set of a plurality of entities and the plurality of power generators includes at least two types of power generators, wherein a first type of power generator includes an exhaustible material consuming power generator at a first cost and a second type of power generator includes a renewable energy-based power generator at a second cost, the method comprising:
determining power load demands of the power demanding units;
storing the power load demands as a first set of logical descriptions;
determining characteristics of the power generators, wherein the characteristics include:
a reliability of the first and the second power generators; and
the first cost and the second cost;
storing the characteristics of the power generators as a second set of logical descriptions;
determining allocation of power capacity from at least the first and the second power generators to meet the power load demands of the power demanding units based upon the first set of logical descriptions and the second set of logical descriptions while satisfying one or more predetermined constraints that include a selection by a consumer of the power that indicates a first amount of energy to be provided by the first type of power generator at the first cost and a second amount of energy to be provided by the second type of power generator at the second cost and are associated with at least one of the power demanding units, wherein the first amount of energy and the second amount of energy are selected based on the first cost and the second cost; and
accessing the one or more predetermined constraints, wherein the one or more predetermined constraints comprise one or more constraints pertaining to service level agreement (SLA) provisions and power generator distribution constraints.

15. The method according to claim 14, wherein determining power load demands of the power demanding units further comprises determining the power load demands of the power demanding units based upon one or more aspects of workloads that are at least one of performed and scheduled to be performed by the power demanding units and one or more power demand constraints pertaining to performance of the workloads, wherein the one or more power demand constraints includes at least one of an economic cost and an environmental cost.

16. The method according to claim 14, wherein the exhaustible material consuming power generator includes a coal based power generator and the renewable energy based power generator includes at least one of a solar power generator, a wind power generator, and a water current power generator.

17. The method according to claim 14, wherein the first power generator and the second power generator are used to generate power for a single power demanding unit and a first portion of energy from the first power generator and a second portion of energy from the second power generator are determined based on the total cost of energy from the first and the second power generator.

18. The method according to claim 17, wherein the first portion of energy and the second portion of energy are further determined based on a reliability of the first and the second power generators.

19. A non-transitory machine readable storage medium on which is embedded machine readable instructions, said machine readable instructions, comprising:
instructions for virtualized management of power distribution among a plurality of power demanding units from a plurality of power generators, wherein the plurality of power demanding units and the plurality of power generators are each a separate non-overlapping set of a plurality of entities and the plurality of power generators includes at least two types of power generators, wherein a first type of power generator includes an exhaustible material consuming power generator and a second type of power generator includes a renewable energy-based power generator, said machine readable instructions comprising a set of instructions to:

determine power load demands of the power demanding units, wherein a first portion of the power load demands is selected to be generated by the first type of power generator based on a first cost of the first portion of power load demands and a second portion of the power load demands is selected to be generated by the second type of power generator based on a second cost of the second portion of power load demands;

store the power load demands as a first set of logical descriptions;

determine characteristics of the power generators, wherein the characteristics include:
  a reliability of the first and the second power generators; and
  the first cost and the second cost;

store the characteristics of the power generators as a second set of logical descriptions; and determine allocation of power capacity from one or more of the power generators to meet the power load demands of the power demanding units based upon the first set of logical descriptions and the second set of logical descriptions while satisfying one or more predetermined constraints that include a selection by a consumer of the power that indicates a first amount of energy to be provided by the first type of power generator and a second amount of energy to be provided by the second type of power generator and are associated with at least one of the power demanding units, wherein the selection of the first amount and the second amount is based on the first cost of the power provided by the first type of power generator and the second cost of the second type of power generator, wherein the first amount of energy and the second amount of energy are selected based on a total cost for energy from the first type of power generator and energy from the second type of power generator;

wherein the one or more predetermined constraints comprise one or more of service level agreement (SLA) provisions and power generator distribution constraints.

20. The machine readable storage medium according to claim 19, said machine readable instructions further including a set of instructions to:

determine the power load demands of the power demanding units based upon one or more aspects of workloads that are at least one of performed and scheduled to be performed by the power demanding units and one or more power demand constraints pertaining to performance of the workloads.

* * * * *